Sept. 4, 1973  H. C. MILLER  3,756,796
METHOD OF FORMING A PERIPHERAL GRINDING WHEEL
Filed June 16, 1971  3 Sheets-Sheet 1
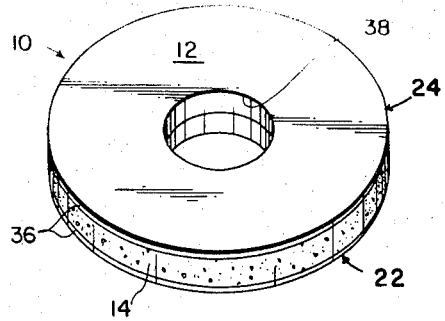
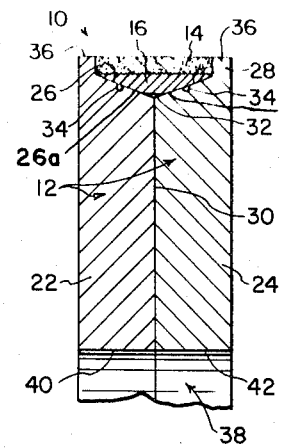
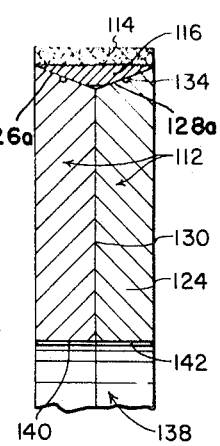
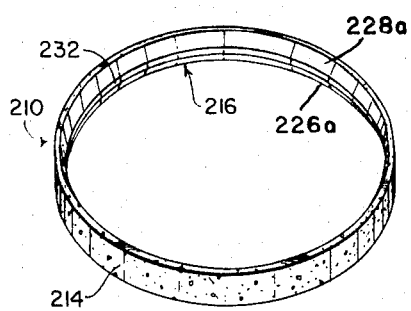
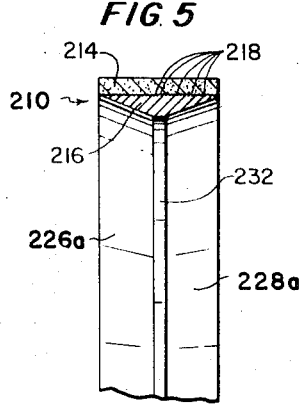
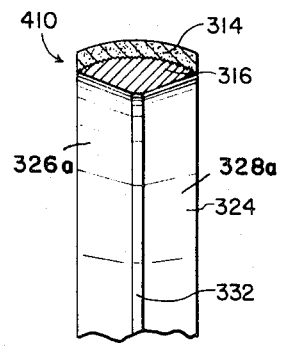
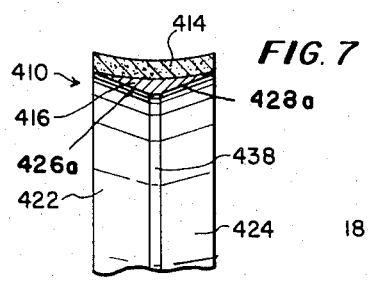
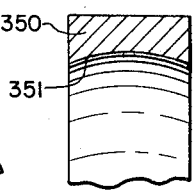
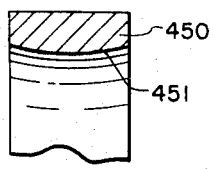
INVENTOR:
HAROLD C. MILLER
By Norman F. Gerlach Sept. 4, 1973  H. C. MILLER  3,756,796
METHOD OF FORMING A PERIPHERAL GRINDING WHEEL
Filed June 16, 1971  3 Sheets-Sheet 3

INVENTOR:
HAROLD C. MILLER
By Norman Berlach

United States Patent Office 3,756,796
Patented Sept. 4, 1973

3,756,796
METHOD OF FORMING A PERIPHERAL
GRINDING WHEEL
Harold C. Miller, Chicago, Ill., assignor to
Super-Cut, Inc., Chicago, Ill.
Continuation-in-part of application Ser. No. 858,474, Sept. 16, 1969, which is a division of application Ser. No. 690,201, Dec. 13, 1967, now Patent No. 3,522,676. This application June 16, 1971, Ser. No. 153,726
Int. Cl. B24d 5/02
U.S. Cl. 51—293
3 Claims

ABSTRACT OF THE DISCLOSURE

A method of making an internally reinforced peripheral grinding wheel by applying radial outward pressure to a mold mixture confined within an annular ring in the presence of heat.

---

This application is a continuation-in-part of my U.S. patent application Ser. No. 858,474, filed on Sept. 16, 1969 now abandoned and entitled "Method of Forming a Peripheral Grinding Wheel," said application Ser. No. 858,474 being a division of my parent application Ser. No. 690,201, filed on Dec. 13, 1967 and originally entitled "Peripheral Grinding Wheel and Method and Apparatus for Making the Same," such parent application having now matured into U.S. Pat. No. 3,522,676, granted on Aug. 4, 1970 and entitled "Peripheral Grinding Wheel."

The present invention relates to a method of forming an abrasive grinding wheel of the type which is commonly referred to as a peripheral grinding wheel. Such a wheel ordinarily comprises a flat circular steel body or hub, the periphery of which is surrounded by an annular grinding member in the form of a sintered metal or other matrix having uniformly distributed therethrough crushed or fragmented diamonds or other hard abrasive particles such as tungsten carbide, silicon carbide or fused alumina.

Heretofore, and as exemplified in U.S. Pat. No. 3,369,879, granted on Feb. 20, 1968 and entitled "Method of Making a Peripheral Diamond Grinding Wheel," it has been the practice to fabricate a peripheral grinding wheel by establishing an annular mold cavity around the periphery of a circular metallic hub, the cavity being defined by the periphery of the hub itself together with an outer encompassing mold ring and two opposed laterally movable mold rings. A mold mixture consisting of powdered metal or other fusible powder with uniformly distributed abrasive particles therein is placed in the mold cavity and the relatively movable mold rings are forced towards one another during the application of heat to the mold cavity in order to sinter or fuse the powdered metal or other material and reduce the width of the mold cavity to the desired dimension which usually is the width or thickness of the metal hub. After cooling, the three mold rings are removed and the thus formed annular grinding member remains bonded to the periphery of the hub and these two bonded-together parts constitute the finished grinding wheel.

Such a method has proven quite satisfactory in connection with the formation or fabrication of narrow grinding wheels where the width or thickness of the annular grinding members does not exceed one and one-half inches. However, it has been found in connection with the fabrication of wider grinding wheels such, for example, as wheels having annular grinding members of a width on the order of two inches or more, that this method is not altogether satisfactory. Where grinding wheels having annular grinding members as wide as four inches are concerned, the aforementioned method is entirely without value. The reason for this is that the tremendous pressure that is required for proper sintering or fusing must be equally distributed throughout the filled mold cavity in order to avoid soft spots of low density in the finished annular grinding member. Where an axially long, but radially narrow, mold is concerned, the frictional opposition that is offered to the flow of the powdered metal or other fusible material in the mold cavity by movement of the laterally movable mold rings towards one another does not enable full molding pressure to reach the central regions of the mold cavity with the result that proper and complete sintering or fusing of the powdered matrix material takes place only near the end regions of said mold cavity. In other words, Pascal's principle of pressure transmission within a confined fluid does not apply.

The present invention makes possible the satisfactory fusing of a powdered matrix-producing material in situ on the periphery of a steel or other metal grinding wheel hub to a width far in excess of the aforementioned tolerable width. Commercial peripheral diamond grinding wheels having annular grinding members on the order of four inches already have been made according to the present invention and there is no reason to suppose that there is any limit to the width which may be accommodated by such method.

According to the present invention, instead of applying lateral or axial inward pressure to the mold mixture within the mold cavity, radial outward pressure is applied to the mixture. Thus, since the annular mold cavity is of extremely small radial thickness, relatively speaking, uniform compacting of all portions of the mold mixture in the mold cavity along its width will take place and thus the particular width of the mold cavity (and consequently of the annular grinding member to be formed) is of no consideration. The mechanical difficulties which are posed in applying radial outward pressure to the mold mixture in the annular mold cavity have been overcome by utilizing a rigid outer mold wall or ring, a pair of opposed rigid side mold walls, and a radially expansible inner mold wall, the latter constituting all, or a portion of, the wheel hub and the four walls defining a radially shrinkable or compressible mold cavity. Means are provided for effecting uniform outward radial expansion of the inner mold wall in the presence of heat, thus resulting in magnified circumferential expansion thereof, advantage being taken of the stretchability of the metal of the inner mold wall to permit such expansion. To effect such radial and circumferential expansion, a pair of opposed cam rings having frusto-conical cam surfaces are forced into the side regions or confines of the inner mold wall so as to exert the necessary spreading action incident to radial expansion of said inner mold wall. The heated environment in which this spreading action takes place supplies the necessary heat for fusing the powdered component of the mold mixture, as well as for rendering the inner mold wall so sufficiently ductile that it will succumb to the radial expansion and remain in its expanded state after cooling. The provision of such a method of applying radial pressure to a mold mixture (admixture of powdered metal or other fusible moldable material and abrasive particles) which is confined in the vicinity of such a hub, constitutes the principal object of the present invention.

In practicing the aforementioned method commercially, and in the manufacture of various forms of peripheral diamond grinding wheels, if it is desired that a finished peripheral diamond grinding wheel shall emerge from the molding operation, the aforementioned cam rings, together with the inner mold wall, are caused to constitute a composite three-part grinding wheel hub, the assembly of which produces the necessary radial expansion of the inner mold wall. If it is desired that the user of the wheel shall supply his own hub assembly, then a temporary composite hub, likewise comprised of two cam rings and an inner mold wall, is employed but the two cam rings are made removable so that after the temporary hub has been created during the molding operation, the cam rings may be removed, leaving only the inner mold wall to which the annular grinding member is firmly bonded by reason of the molding operation. In these two respects, two basic modifications of the present method are contemplated and the practicing thereof will be described in detail presently. Further modifications of a minor nature have been developed, one such modification affording a convenient means for exposing the interior of the mold cavity for filling purposes prior to resorting to the step of causing radial expansion of the inner mold wall, this latter modification also being described in detail subsequently.

Insofar as the employed apparatus for practicing the above-outlined method is concerned, the use of cooperating frusto-conical cam surfaces of small slant angle to effect radial expansion of the inner mold wall in a heated environment produces a powerful outward radial thrust on the inner expansible mold wall far in excess of that attained by such known means for expanding a ring radially as the utilization of hydraulic expanding devices or sliding split ring arrangements in combination with toggle members.

In connection with the completed peripheral grinding wheel, whether the annular grinding member be applied to a complete hub or merely to an outer hub ring as previously described, the structure evolved from practicing the present method, particularly where a wide annular grinding member is concerned, is of a superior nature in that it is devoid of areas of low density while at the same time a firm bond between the annular grinding member and its supporting ring (i.e., the inner mold wall) is obtained coextensively along the entire annular interface.

In the accompanying three sheets of drawings forming a part of this specification, the method constituting the present invention is illustrated in connection with several embodiments of an apparatus for performing or carrying out the method, as well as for constructing several forms of grinding wheels.

In these drawings:

FIG. 1 is a perspective view of a peripheral grinding wheel constructed according to the method of the present invention, the wheel having a confined annular grinding member (sintered or fused metal or other matrix with crushed or fragmented diamond or other abrasive particles distributed uniformly throughout);

FIG. 2 is an enlarged radial sectional view taken on the line 2—2 of FIG. 1;

FIG. 3 is a sectional view similar to FIG. 2 but showing a modified form of grinding wheel in which the side portions thereof have been milled away to expose the sides of the annular grinding member;

FIG. 4 is a perspective view of a backing ring and annular grinding member assembly constructed according to the present method, the assembly being designed for removable mounting on a separately fabricated hub assembly;

FIG. 5 is an enlarged radial sectional view taken on the line 5—5 of FIG. 4;

FIG. 6 is a sectional view similar to FIG. 5 but showing a slightly modified form of backing ring and annular grinding member assembly;

FIG. 6a is a fragmentary radial sectional view taken through an outer mold ring which is employed in forming the backing ring and annular grinding member assembly of FIG. 6;

FIG. 7 is a sectional view similar to FIGS. 5 and 6 but showing a further modified form of backing ring and annular grinding member assembly;

FIG. 7a is a fragmentary radial sectional view taken through an outer mold ring which is employed in forming the backing ring and annular grinding member assembly of FIG. 7;

FIG. 8 is a perspective view of a fragment of the inner mold ring which is employed in fabricating the peripheral grinding wheel of FIG. 1;

Figure 9:
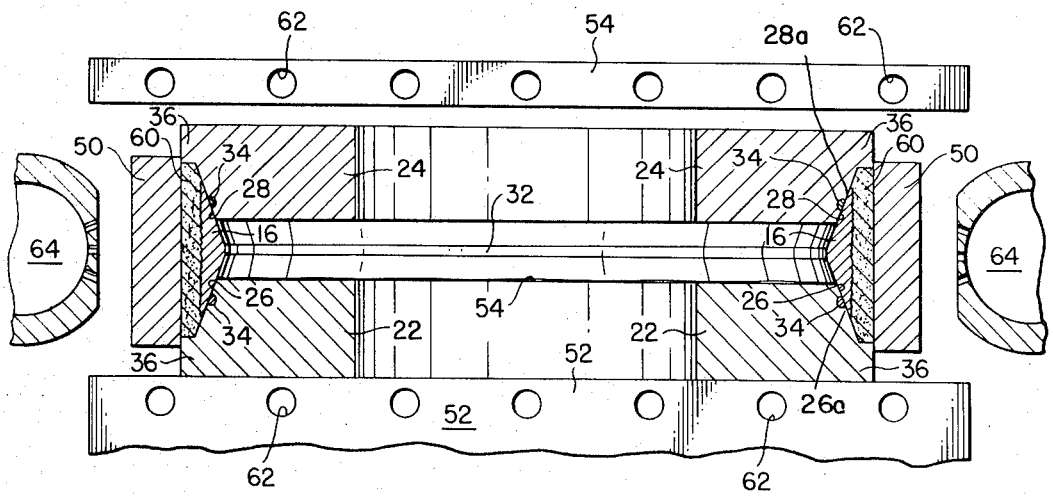
FIG. 9 is a fragmentary sectional view taken substantially centrally and vertically through the various mold parts which are employed in connection with the method of the present invention, such view showing the parts in the relative positions which they assume immediately prior to the fusing and molding operation in the production of the grinding wheel of FIG. 1.

Referring now to the drawings in detail and in particular to FIGS. 1 and 2, there is illustrated in detail a peripheral grinding wheel which is formed by the method of the present invention, the wheel being designated in its entirety by the reference numeral 10. The wheel is of a composite nature and consists of (1) an inseparable two-part metal hub 12 which preferably is formed of steel, (2) an annular grinding member 14, and (3) a backing ring 16 for the annular grinding member, the backing ring likewise preferably being formed of steel. The structural characteristics of the grinding wheel 10 are largely a result of the method by means of which the wheel is formed, which is not to say that the structural features thereof do not, in themselves, vary widely from a conventional grinding wheel which is designed for the same purpose. However, since a full description of the method will be set forth subsequently, the present description of the grinding wheel 10 will be limited almost entirely to its structural make-up, reference to the method being made only in the interests of clarifying the grinding wheel structure and paving the way for a better understanding of the method when its description is undertaken subsequently.

Still referring to FIGS. 1 and 2, the annular grinding member 14 is in the form of a continuous, ring-shaped matrix (fused metal or other powder) with diamond or other abrasive particles distributed substantially uniformly throughout the same. The member 14 encompasses the metal backing ring 16 and its inner periphery or side is bonded to the outer periphery or side of the backing ring by reason of either soldering or the compacting and fusing operation which is performed on the originally loose metal or other powder and abrasive particles in the presence of heat and which results in fusing of the opposed peripheral surfaces or sides of the two parts, all in a manner that will be described in greater detail when the nature of the present method is set forth. The bond between the annular grinding member 14 and the backing ring 16 is enhanced by the provision of a multiplicity of concentric, circular or circumferential striations 18 (see FIG. 8) which are provided on the outer and otherwise cylindrical side 20 of the backing ring. The backing ring 16 has substantially the radial cross-sectional shape of an isosceles triangle of small slant angle and this ring encompasses the main body portion of the composite hub 12 and seats squarely within a peripheral recess which is of V-shaped cross section and is provided in the periphery of the hub. The recess is formed by reason of the bringing together of the two sections 22 and 24 of the two-part hub 12, the sections being provided respectively with frusto-conical surfaces 26 and 28 which are of small slant angle and small slant height and come together in diabolo or hourglass fashion when the inner side faces of the sections are brought together in face-to-face contact or abutment along a common meeting plane or interface 30.

Except for the provision of a small centrally located annular flat 32 on the inner side of the annular grinding member 16, this inner side is shaped conformably to the V-shape contour of the aforesaid recess and embodies adjacent and oppositely extending frusto-conical surfaces 26a and 28a corresponding and shaped similarly to the frusto-conical surfaces 26 and 28 of the hub sections 22 and 24. Small annular grooves 34 are formed in and extend around the frusto-conical surfaces 26 and 28 and are provided for reception of lengths of brazing wire or solder prior to subjecting the parts to the application of heat in performing the brazing or soldering operation. A layer or coating of brazing or soldering compound also unites and/or bonds together the two sections 22 and 24 of the two-part metal hub 12. Outwardly and radially extending retaining flanges 36 straddle the annular grinding member 14 and these flanges are integral parts of the hub sections 22 and 24 and come within the sphere of influence of the molten brazing or soldering material during the heating operation so that they are thus bonded to the sides of said annular grinding member. The hub 12 may be provided with any desired mounting facilities by means of which it may be secured to a rotatable power shaft. Accordingly, a central arbor-receiving hole 38 is provided through the hub, this hole resulting from the provision of mating central holes 40 and 42 in the two hub sections 22 and 24.

Figure 10:
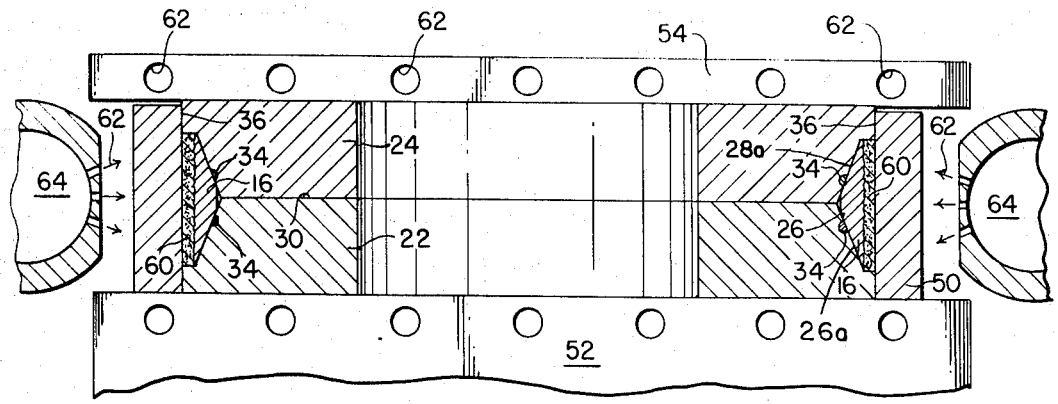
FIG. 10 is a sectional view similar to FIG. 9 but showing the mold parts in the positions which they assume during the fusing and molding operation.

Referring now to FIGS. 9 and 10 wherein there is illustrated the method by means of which the grinding wheel 10 is constructed, the assembly of the various grinding wheel parts described above is made by utilizing the two hub sections, as well as the backing ring 16 as relatively movable mold parts, an additional mold part in the form of an outer mold ring 50 being employed. The assembly is preferably made in a mold press including a lower press platen 52 and an upper press ram 54. The assembly is made by placing either hub section as, for example, the section 22, on the platen 52 in a horizontal position and then causing the outer portion of the inner frusto-conical surface 26a of the backing ring 16 to rest on the inner portion of the frusto-conical surface 26 of the hub section 22 (see FIG. 9) so that the backing rings projects upwardly above the level of the section 22 an appreciable distance. A quantity of brazing material is spread on the upper side surface 54 of the hub section 22 and a length of wire-type silver solder or the like is disposed in the annular groove 34 in the frusto-conical surface 26 of the thus positioned hub section 22. The other hub section 24 is then placed or superimposed in a similar manner on the backing ring 16 and so positioned that the inner portion of the frusto-conical surface 28 seats on the outer portion of the frusto-conical surface 28a of the backing ring 16, a length of silver solder being first placed in the groove 34 in said frusto-conical surface 28 of said other hub section 24. Thereafter, the outer mold ring 50 is telescopically received over the two hub sections 22 and 24. The minimum internal diameter of the backing ring 16 is less than the minimum diameter of either hub section and the maximum external diameter of both frusto-conical surfaces 26 or 28 is greater than the maximum internal diameter of both inner frusto-conical surfaces 26a and 28a of the backing ring 16. Additionally, the slant height of all four of the frusto-conical surfaces is equal, with the slant angle thereof being on the order of 40° or less. The net result of such proportioning or dimensioning of the parts (hub sections 22 and 24 and backing ring 16) is such as to establish a continuous annular mold cavity 60 when the various mold parts are assembled loosely as described above and as shown in FIG. 9. This mold cavity 60 is a variable volume cavity and it is defined by the inside cylindrical surface of the outer mold ring 50, the striated outer surface of the backing ring 16, a limited portion of each frusto-conical surface 26 and 28, and the two opposed inner surfaces of the retaining flanges 36. In making or fabricating the wheel 10 by way of the mold, it is contemplated that the mold cavity will be suitably filled with the mold mixture before the parts of the mold structure or apparatus are fully assembled.

From the above description, it will be apparent that by causing the two hub sections 22 and 24 to move relatively toward each other in response to downward movement of the upper press ram 54, a powerful camming action will be exerted upon the backing ring 16 tending to stretch the latter in a radial direction, thus causing the same to increase its diameter and exert a radial compressional force on the mold mixture (fusible powdered metal or other material with abrasive particles distributed uniformly throughout) which is introduced into the mold cavity 60. At the same time, the two opposing surfaces of the shoulders 36 move toward each other and offer a limited amount of transverse compressional force to the mold mixture within the cavity. The mold mixture is thus compressed in all directions, but the compression thereof is largely radial. When the two hub sections 22 and 24 are moved toward each other in the presence of heat, the molecular tenacity of the metal backing ring is reduced to such an extent that it will readily yield to the radial forces tending to stretch it. The necessary heat may be supplied to the assembled parts in the vicinity of the backing ring 16 in any suitable manner as, for example, by application to the mold ring of a series of inwardly directed flame jets 62 issuing from a gaseous fuel burner ring 64. So far as the aforementioned mold mixture is concerned, the matrix component thereof may be of a sinterable or fusible powdered metal or a fusible resinous material in the form of powdered epoxy resin or phenolic resin or a fusible ceramic material in the form of powdered low-melting glass. With respect to the abrasive particle component of the mold mixture, such component may be crushed or fragmented diamonds or particles of tungsten carbide, silicon carbide, or aluminum oxide, or a combination of diamond and other abrasive particles.

The final position of the various mold parts is shown in FIG. 10 wherein it will be noted that the upper hub section 24, having moved downwardly and into face-to-face contact with the lower hub section 22, has become bonded to this latter section coextensively along the interface 30 while at the same time converging inner frusto-conical surfaces 26a and 28a of the metal backing ring 16 have become bonded to the frusto-conical surfaces 26 and 28 of the two hub sections, such bonding taking place by reason of the capillary flow of solder over these surfaces in the presence of flux. The camming engagement between the frusto-conical surfaces 26 and 28 of the hub sections 22 and 24 and the frusto-conical surfaces 26a and 28a of the backing ring 16 causes the ring to stretch outwards and thus increase its radial dimension so as to compress the mold mixture in a radial direction against the outer reaction mold ring 50, while at the same time limited transverse compression of the mixture between the retaining flanges 36 is caused to take place. Due to fusing of the powdered metal or other material in the mold cavity 60 under the influence of heat and pressure, the compacted annular grinding member 14 becomes bonded to the outer striated side 20 of the backing ring 16.

It is to be noted at this point that during descent of the upper press ram 54 sliding of the frusto-conical surfaces 26 and 28 of the hub sections 22 and 24 on the inner frusto-conical surfaces 26a and 28a of the backing ring 16 brings the sharp circular lateral edges of the backing ring against the annular retaining flanges 36 while the opposed meeting inner side surfaces of the two hub sections 22 and 24 come together and establish a small void in the vicinity of the annular flat 32 on the backing ring 16. This flat 32 is provided in order to accommodate any discrepancy in manufacturing tolerances which might otherwise prevent square seating of the two hub sections 22 and 24 on each other.

A series of channels 66 are formed in both the lower press platen 52 and the upper press ram 54 for circulation of a coolant fluid therethrough to prevent undue heat accumulation in these parts during formation of the grinding member.

In FIG. 3, a slightly modified form of grinding wheel 110 is shown, this wheel being constructed and assembled by the same method that is illustrated in FIGS. 9 and 10, and in the same mold apparatus. The only difference between the wheel 110 and the wheel 10 is that the outer side portions of the hub sections 122 and 124 have been milled away to such depth that there are no outwardly extending annular retaining flanges 36, thus exposing the side surfaces of the annular grinding member 114. In order to avoid needless repetition of description, similar reference numerals but of a higher order are applied to the corresponding parts as between the disclosures of FIGS. 3 and 2. The grinding wheel 10 with its annular retaining flanges 36 may be found useful in shaping the edges of a sheet of glass, whereas the grinding wheel 110 which is devoid of such flanges may be caused to operate upon a flat planar surface.

Figure 11:
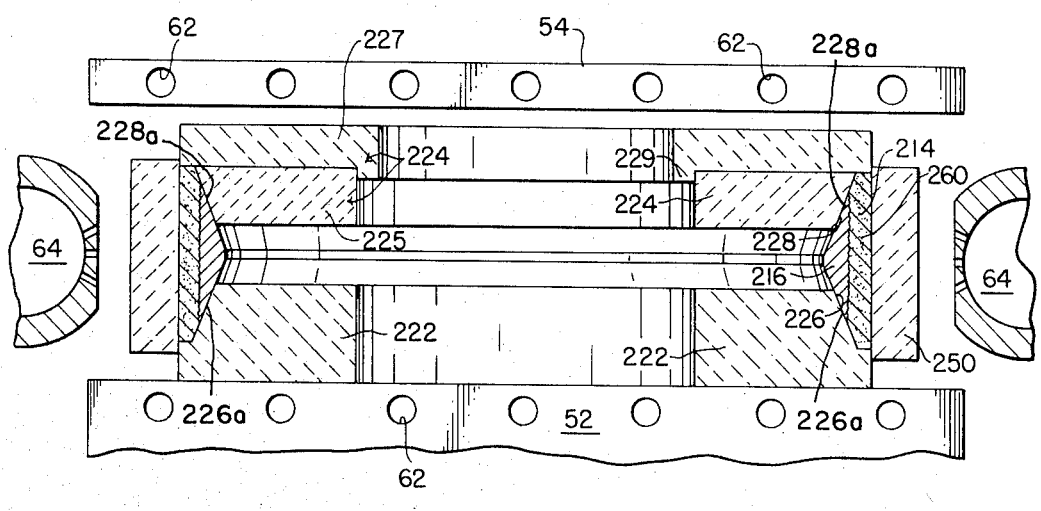
FIGS. 11 and 12 are sectional views similar to FIGS. 9 and 10, respectively, showing the production of the backing ring and annular grinding member assembly of FIG. 4.
Figure 12:
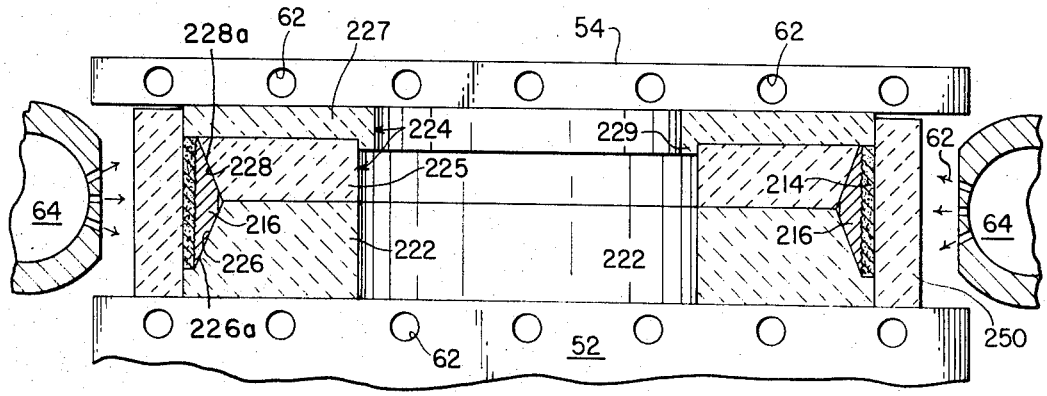

Whereas in the manufacture of either the grinding wheel 10 of FIGS. 1 and 2 or the grinding wheel 110 of FIG. 3, the two hub sections as well as the backing ring constitute movable cavity-forming mold parts which remain bonded to one another and are allowed to remain bonded so as to become actual elements of the finished wheel, it may be desirable in certain instances to supply only a reinforced or backed peripheral grinding wheel subassembly as a salable article to which the purchaser may affix his own hub structure. Such a reinforced subassembly is illustrated in FIGS. 4 and 5 and is designated in its entirety by the reference numeral 210. Again, in the order to avoid repetition of description, similar reference numerals of a still higher order are employed in order to designate the corresponding parts as between the disclosures of FIGS. 5 and 3. To produce the two-piece peripheral grinding wheel subassembly 210 including only an annular grinding member 214 and its backing ring 216, the mold structure or apparatus of FIGS. 11 and 12 is employed. Utilizing corresponding reference numerals of a higher order as between the disclosures of FIGS. 11 and 12 and FIGS. 9 and 10, the mold apparatus of FIGS. 11 and 12 remains substantially the same as the mold apparatus of FIGS. 9 and 10 except for the fact that the upper mold ring 224 is formed of two parts 225 and 227, the annular solder-retaining grooves 34 are omitted, and the upper and lower mold rings, as well as the outer mold ring 250 are preferably, but not necessarily, formed of graphite. By omitting the application of solder to the interface between the upper and lower mold rings 224 and 222, removal of these rings after the sintering operation has been completed is made possible since there is no tendency for these parts to adhere to each other or to the steel backing ring 216. Removal of the outer mold ring 250 also is facilitated.

The upper mold ring 224 is made of the two parts 225 and 227 in order to facilitate filling of the mold cavity 260 with the mold mixture. A depending annular flange 229 on the inner marginal portion of the upper part 227 of the upper mold ring 224 establishes an interlock between the parts 225 and 227 for centering purposes. It will be observed that before the upper part 227 is applied during mold assembly operations, the upper rim of the annular mold cavity 260 is exposed for filling purposes. After the cavity has been filled with the proper amount of loose mold mixture, the part 227 may be placed on the part 225 to close the filling opening, after which the molding process may take place in the same manner as described in detail in connection with the mold structure or apparatus of FIGS. 9 and 10.

In FIG. 6, a further modified form of reinforced peripheral grinding wheel subassembly is disclosed and it is designed in its entirety by the reference numeral 310.

The annular grinding member 312 is of concavo-convex radial cross section with its convex side facing outwardly, and the backing ring 316 is formed with an outer convex striated outer side 320 to accommodate the convex inner surface of the annular grinding member. Similarly, in the molding process or method which is conducted in accordance with the principles set forth in connection with FIGS. 11 and 12, the outer mold ring 350 (see FIG. 6a) is formed with a concave inner surface 351 in order to accommodate the convex outer surface of the annular grinding member. The actual molding and milling procedures which are employed in connection with the manufacture of the reinforced peripheral wheel subassembly 310 of FIG. 6 do not deviate from those that are employed in the manufacture of the reinforced grinding wheel subassembly 210.

In FIG. 7 yet another form of reinforced peripheral grinding wheel subasembly is shown and it is designated by the reference numeral 410. The annular grinding member 414 is of concavo-convex radial cross section with its concave side facing outwardly. The outer mold ring 450 (see FIG. 7a) which is employed in connection with the molding apparatus for forming the subassembly 410 has an inner convex surface 451 and it is conformable to the outer exposed concave surface of the annular grinding member 414.

The invention is not to be limited to the exact method steps described herein since the method of the present invention is readily applicable to the formation of other forms and shapes of peripheral grinding wheels, either with permanent hub portions as illustrated in FIGS. 1, 2 and 3, or with detachable hub portions as described in connection with the reinforced subassemblies of FIGS. 4 to 7, inclusive. For example, the reinforced peripheral grinding wheel subassembly of FIGS. 4 to 7, inclusive, may readily have permanent hub structures applied thereto by forming the same in the molding apparatus of FIGS. 9 and 10 instead of in the molding apparatus of FIGS. 10 and 11, it being understood, of course, that the shapes of the involved mold parts will be fashioned to accommodate the configuration of the particular annular grinding members which are to be formed. Still further, whereas the method described herein has been set forth on the basis of utilizing a mixture of metal powder and abrasive particles in the mold cavity, such description is predicated upon the use of specific materials which have been found practical in actual practice. It is within the purview of the invention, however, to utilize various vitreous or other non-metallic fusible powdered materials which, strictly speaking, are fused rather than sintered.

Having thus described the invention what I claim as new and desire to secure by Letters Patent is:

1. The method of making an internally reinforced continuous annular grinding member which comprises the steps of:
   (1) providing an outer cylindrical mold ring having a continuous inwardly presented annular mold surface,
   (2) providing an inner metal backing mold ring having a continuous outwardly presented annular mold surface of less over-all diameter than the over-all diameter of said inwardly presented mold surface of the outer mold ring,
   (3) positioning said mold rings so that said inwardly and outwardly presented mold surfaces are concentric and define therebetween an annular mold cavity,
   (4) filling said cavity with a mixture of fusible moldable abrasive-containing material,
   (5) creating an atmosphere of heat in the vicinity of the mold cavity to heat both the mixture and the mold rings to a temperature sufficient to fuse said material,
   (6) forcibly projecting a pair of frusto-conical expansion members axially into the inner backing mold ring from opposite sides thereof and in intimate coextensive circumferential camming contact therewith so as to apply outward radial pressure to the thus heated inner backing mold ring to expand the same uniformly and by a stretching operation increase the circumference thereof, thus compressing the mixture in the mold cavity against said inwardly presented mold surface, fusing the moldable material, and heat-bonding the same to said outwardly presented mold surface, and (7) removing said outer mold ring.

2. The method of making an internally reinforced continuous annular grinding member as set forth in claim 1 and including the additional step of applying lateral inward pressure to the mixture in the mold cavity simultaneously with the expansion of the inner mold ring.

3. The method of making a peripheral grinding wheel of the type that has, in concentric relationship around the circumference of a circular metal wheel hub, a continuous annular grinding member in the form of a sintered metal matrix having abrasive particles disposed therein, said method comprising the steps of:

(1) providing an outer cylindrical mold ring having a continuous annular inwardy presented mold surface, (2) providing an inner metal backing mold ring having a continuous annular outwardly presented mold surface of less over-all diameter than the over-all diameter of said inwardy presented mold surface of the outer mold ring, (3) positioning said mold rings so that said inwardly and outwardly presented mold surfaces are concentric and define therebetween an annular mold cavity, (4) filling said cavity with a mixture of fusible abrasive-containing material, (5) creating an atmosphere of heat in the vicinity of said mold cavity to heat both the mixture and the mold rings to a temperature sufficient to fuse said material, (6) providing a pair of disk-like metal hub sections each of which is substantially in the form of a truncated cone, (7) placing a bonding material between said hub sections, (8) forcibly projecting said hub sections sidewise and axially into the inner backing mold ring from the opposite sides thereof and in intimate coextensive circumferential camming contact therewith in order uniformly to expand such backing mold ring radially and circumferentially by a stretching operation, thus increasing the diameter of said outwardly presented mold surface and compressing the heated mixture in the mold cavity against said inwardly presented mold surface, fusing the moldable material, and heat-bonding the thus fused material to said outwardly presented mold surface of the backing mold ring, (9) continuing such projecting of the sections until their small cone bases meet in interfacial coextensive contact, thus bonding said sections together to establish a composite hub, and

(10) removing said outer mold ring.

References Cited
UNITED STATES PATENTS

| | | | |
|---|---|---|---|
| 3,470,047 | 9/1969 | Bragaw | 51—309 |
| 3,385,684 | 5/1968 | Voter | 51—298 |
| 2,240,829 | 5/1941 | Bevillard | 51—309 |
| 2,800,753 | 7/1957 | Hollstrom | 51—309 |
| 2,467,596 | 4/1949 | Pratt | 51—309 |
| 2,476,699 | 7/1949 | Cline | 51—309 |
| 3,329,138 | 7/1967 | Lupardo | 51—309 |
| 3,573,013 | 3/1971 | Curn et al. | 51—309 |

DONALD J. ARNOLD, Primary Examiner

U.S. Cl. X.R.

51—206, 298, 309